United States Patent [19]
Kim

[11] Patent Number: 5,897,217
[45] Date of Patent: Apr. 27, 1999

[54] APPARATUS AND METHOD FOR CONTROLLING RECORDING IN ACCORDANCE WITH A REMAINDER OF A RECORDING MEDIUM

[75] Inventor: Yong Ho Kim, Kyungki-do, Rep. of Korea

[73] Assignee: Samsung Electronics Co., Ltd., Kyungki-do, Rep. of Korea

[21] Appl. No.: 09/072,557

[22] Filed: May 5, 1998

[30] Foreign Application Priority Data

May 13, 1997 [KR] Rep. of Korea ...................... 97-18580

[51] Int. Cl.⁶ ..................................................... H04N 5/91
[52] U.S. Cl. .............................................. 386/67; 386/52
[58] Field of Search ................................. 386/1, 4, 9, 39, 386/67, 68, 81, 83, 52, 46; H04N 5/91

[56] References Cited

U.S. PATENT DOCUMENTS

| | | | |
|---|---|---|---|
| 5,315,452 | 5/1994 | Hong | 386/46 |
| 5,555,138 | 9/1996 | Kim | 386/67 |
| 5,608,532 | 3/1997 | Park | 386/67 |
| 5,712,945 | 1/1998 | Kim | 386/52 |

*Primary Examiner*—Huy T Nguyen
*Attorney, Agent, or Firm*—Sughrue, Mion, Zinn, Macpeak & Seas, PLLC

[57] ABSTRACT

An apparatus and a method for controlling recordings in accordance with the remainder of a recording medium are disclosed. The recording state is adjusted in accordance with the remainder of the recording medium so that a maximum amount of the images intended to be recorded can be recorded within the limited remainder of the recording medium. If the remainder of the recording medium is insufficient, and thus if the total number of images cannot be recorded even by using a long-play recording mode, then a result of comparing audio and brightness signals input to a signal processing section with reference levels, is supplied to a microcomputer. The microcomputer controls the operations of the recording section and the driving section in accordance with the comparison result. If the images look darker than a reference level, or if the sounds are too weak, then the recording operation is temporarily stopped so that the maximum number of images can be recorded onto the remainder of the recording medium.

8 Claims, 7 Drawing Sheets

APPARATUS AND METHOD FOR CONTROLLING RECORDING IN ACCORDANCE WITH A REMAINDER OF A RECORDING MEDIUM

BACKGROUND OF THE INVENTION

1. Field of the Invention

The present invention relates to an apparatus and a method for controlling recordings. More specifically, the present invention relates to an apparatus and a method for controlling recordings in accordance with the remainder of a recording medium, in which the recording state is adjusted in accordance with the recordable remainder of the recording medium so that a maximum number of the intended images can be recorded in the limited remainder of the recording medium.

2. Description of the Related Art

Recently, recording controlling apparatuses such as a video cassette tape recorder (VCR) and the like have been widely used for appraising movies or video articles. Such a recording controlling apparatus reproduces still pictures or moving pictures from a recording medium to output them to a screen. Such an apparatus can also record the pictures onto the recording medium.

Such a recording medium usually consists of a magnetic tape, and is classified into the following types: 60-minute, 90-minute and 120-minute. Usually, recording is carried out in a "standard recording" mode.

However, if the remainder of the recording medium is insufficient to record the entire recording, the apparatus is shifted to a "SLP mode" or a "LP mode", so that the images can be recorded in a compressed manner, or compress-recorded. Thus, a large number of images can be recorded in spite of the shortage of the recording medium.

FIG. 1 illustrates the above described conventional recording controlling apparatus. Roughly, the conventional recording controlling apparatus includes a signal processing section 10 and a recording section 20.

The signal processing section 10 includes: a band pass filter 11 for detecting carrier chroma signals from incoming video signals; an automatic chroma gain controller (ACC) 12 for controlling the carrier chroma signals detected by the band pass filter 11, to have a certain amplitude; and a balanced modulator 13 for carrying out balanced modulation on the amplitude-controlled carrier chroma signals of the ACC 12. The signal processing section 10 also includes: a low pass filter 14 for detecting brightness signals from the incoming video signals; an automatic gain controller (AGC) 15 for controlling the detected brightness signals of the low pass filter 14 to have a certain amplitude; a frequency modulator 16 for modulating the frequency of the amplitude-controlled brightness signals of the AGC 15; and an adder 17 for mixing together the brightness signals of the frequency modulator 16, the carrier chroma signals of the balanced modulator 13 and separately input audio signals, so as to output recording signals.

The recording section 20 includes: a recording switch 21 for supplying the recording signals output from the signal processing section 10; a recording output device 22 for generating electric currents in a coil 23 in accordance with the recording signals supplied by the recording switch 21; and a recording head 24 for recording data on a recording medium 30 by generating magnetic fields in cooperation with the coil 23.

The recording controlling apparatus further includes: a key input section 40 for inputting a recording starting time and a consumption time period; a remainder detecting section 50 for detecting the remainder of the recording medium 30; a driving section 70 for driving or stopping the recording medium 30, and for adjusting the recording speed; and a microcomputer 60 for controlling the operations of the recording section 20 and the recording medium driving section 70 in accordance with the output signals of the key input section 40 and the remainder detecting section 50.

FIG. 2 is a flow chart for recording images onto a recording medium by using the apparatus of FIG. 1. FIG. 3 illustrate the recording state of data recorded in accordance with the remainder of the recording medium based on the conventional method.

In the conventional recording controlling apparatus as shown in FIG. 1, if video signals are input into the signal processing section 10, those signals pass through the band pass filter 11 and the low pass filter 14 and are detected by being separated into carrier chroma signals and brightness signals.

If the brightness signals detected by the low pass filter 14 have a value greater than a regulated value, the AGC decreases the value of the signals. On the other hand, if the brightness signals detected by the low pass filter 14 have a value less than the regulated value, the AGC increases the value. Thus, the brightness signals are controlled to a certain amplitude. The signals are then supplied to the frequency modulator 16, and thus, the brightness signals are frequency-modulated.

Meanwhile, the carrier chroma signals detected by the band pass filter 11 are supplied to the ACC 12 so they can be controlled to a certain amplitude. Then the signals undergo a balanced modulation through the balanced modulator 13.

Thereafter, the brightness signals, the carrier chroma signals and the audio signals are added together by the adder 17. Thus, those added signals are output as recording signals.

The recording signals are supplied through the recording switch 21 to the recording output device 22 so as to be converted into electric currents. These electric currents flow through the coil 23 which is wound on the head 24. Thus owing to the electric currents flowing through the coil 23, the head 24 generates magnetic fields so that the video signals are recorded onto the recording medium 30.

In this conventional recording controlling apparatus, the recording method is controlled in accordance with the remainder of the recording medium, or recordable remainder, that can be recorded on, as shown in FIG. 2.

That is, when a recording starting time and an expected consumption time period are input through the key input section 40 (101), the microcomputer 60 compares the expected consumption time period with the result detected by the remainder detecting section 50, to detect the recordable remainder of the recording medium (102).

Thereafter, a judgment is made as to whether the total number of images can be recorded at the standard speed within the limits of the remainder of the recording medium 30 (103). If it is possible, then the microcomputer 60 drives the recording medium 30 according to a "standard recording" mode by driving the driving section 70.

On the other hand, if it is impossible to record in "standard recording" mode the total number of images within the limits of the remainder of the recording medium 30, and if it is possible to record the total number of images by employing a combination of "standard recording" and "long play recording" (105), then "standard+long play recording" is carried out (106). Otherwise, "long play recording" is carried out (107).

The procedure of "standard+long play recording" will be described in detail referring to FIG. 3. For example, it will be assumed that the expected consumption time is 50 minutes, and that a 30-minute portion is the remainder of the recording medium 30. In this case, a standard recording operation is carried out for the first 20 minutes, and then a long play recording operation is carried out for the last 10 minutes. During the long play recording, the images are recorded in a compressed state, thereby solving the problem of having an insufficient remainder of the recording medium 30 to complete recording the images.

However, in this conventional recording controlling apparatus, if the remainder of the recording medium is very insufficient compared with the expected consumption time period, then the total number of images cannot be completely recorded even if a long play recording operation is employed for the entire remainder of the recording medium.

SUMMARY OF THE INVENTION

The present invention is intended to overcome the above described disadvantage of the conventional technique.

Therefore it is an object of the present invention to provide a recording controlling apparatus and a control method therefore, in which if the remainder of the recording medium is insufficient compared with the expected recording consumption time, and thus, if the total images cannot be recorded even with a long play recording, then the recording state is adjusted in accordance with the recordable remainder of the recording medium, so that the images to be recorded can be recorded to the maximum degree onto the limited recording medium.

In achieving the above object, the apparatus for controlling a recording in accordance with the remainder of a recording medium according to the present invention includes: a signal processing section for separating incoming video signals into brightness signals and carrier chroma signals, and for amplitude-controlling and modulating them to output recording signals; a recording section for recording the recording signals of the signal processing section onto a recording medium; a recording controlling section for comparing audio signals and brightness signals of the signal processing section with reference levels; a key inputting section for inputting a recording starting time and a consumption time period; a remainder detecting section for detecting a recordable remainder of the recording medium; a recording medium driving section for driving or stopping the recording medium, and for adjusting the recording speed; and a microcomputer for setting reference levels of the recording controlling section, and for controlling the operations of the recording section and the recording medium driving section in accordance with the output signals of the key inputting section and the remainder detecting section based on a compared result of the recording controlling section, whereby if the detected remainder of the recording medium as detected by the remainder detecting section is very much insufficient, and thus if the total images cannot be recorded even with a long play recording, then the result of comparison of the audio signals and video signals of the signal processing section with the reference levels as compared by first and second comparators of the recording controlling section is supplied to the microcomputer, and the microcomputer controls the recording section and the recording medium driving section to temporarily stop the recording upon finding dark pictures and weak sounds.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

The apparatus and method for controlling recording in accordance with the remainder of the recording medium, according to the present invention, will be described referring to FIGS. 4 and 5.

Figure 1:
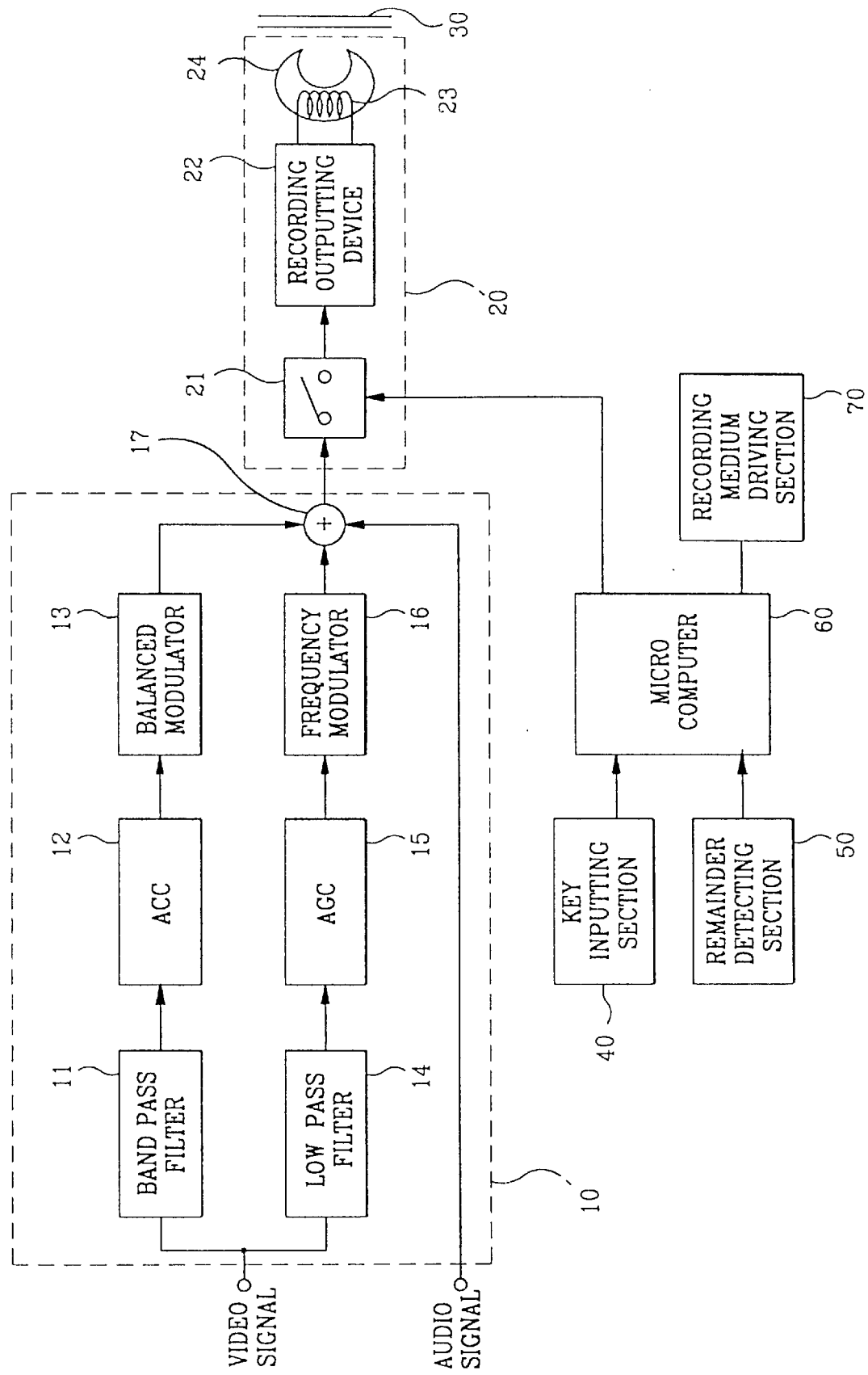
FIG. 1 illustrates the conventional recording controlling apparatus.
Figure 2:
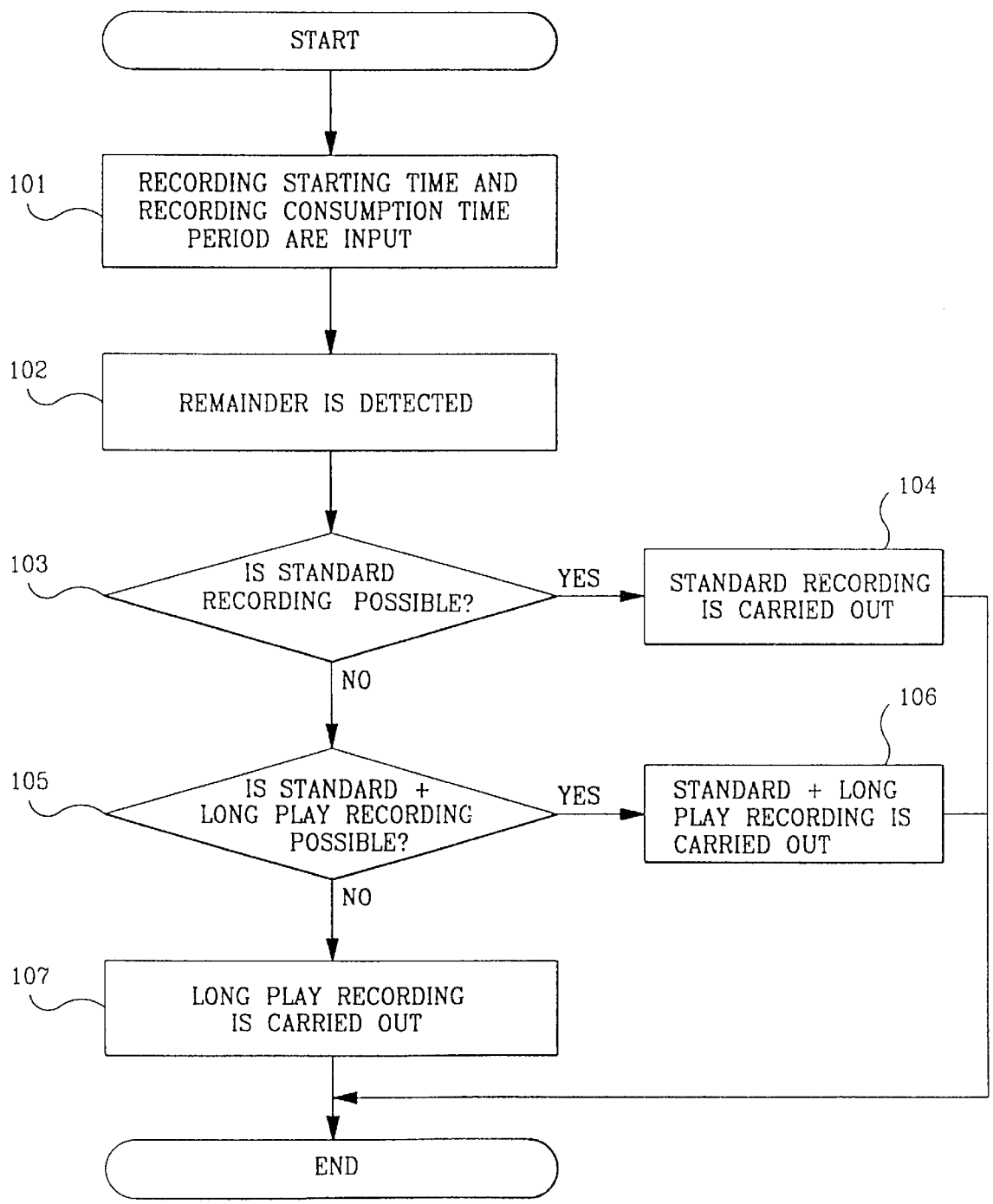
FIG. 2 is a flow chart for a method of recording images onto a recording medium by using the apparatus of FIG. 1.
Figure 3:
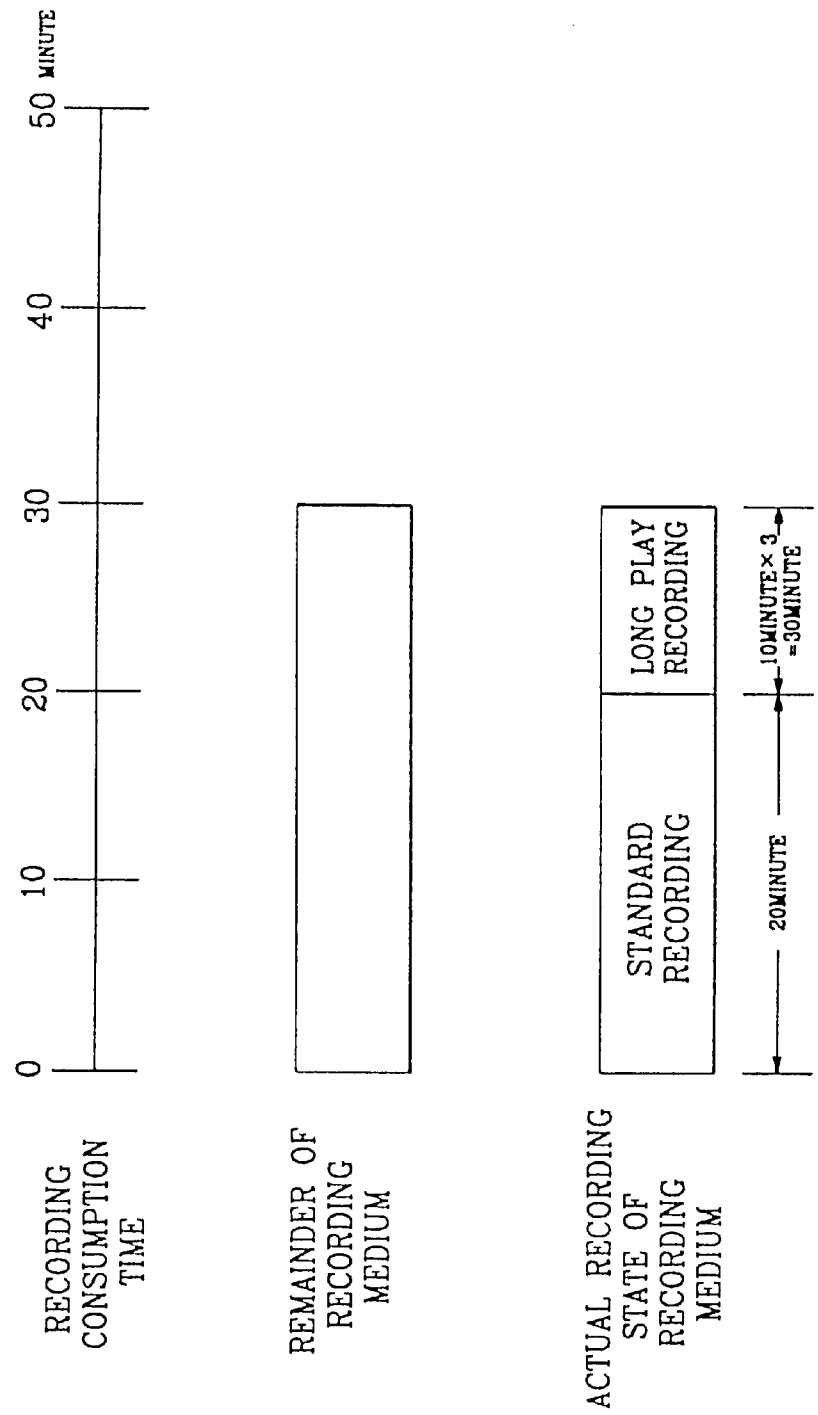
FIG. 3 illustrates the recorded state of the recording medium in accordance with the remainder of the recording medium, based on the conventional method.
Figure 4:
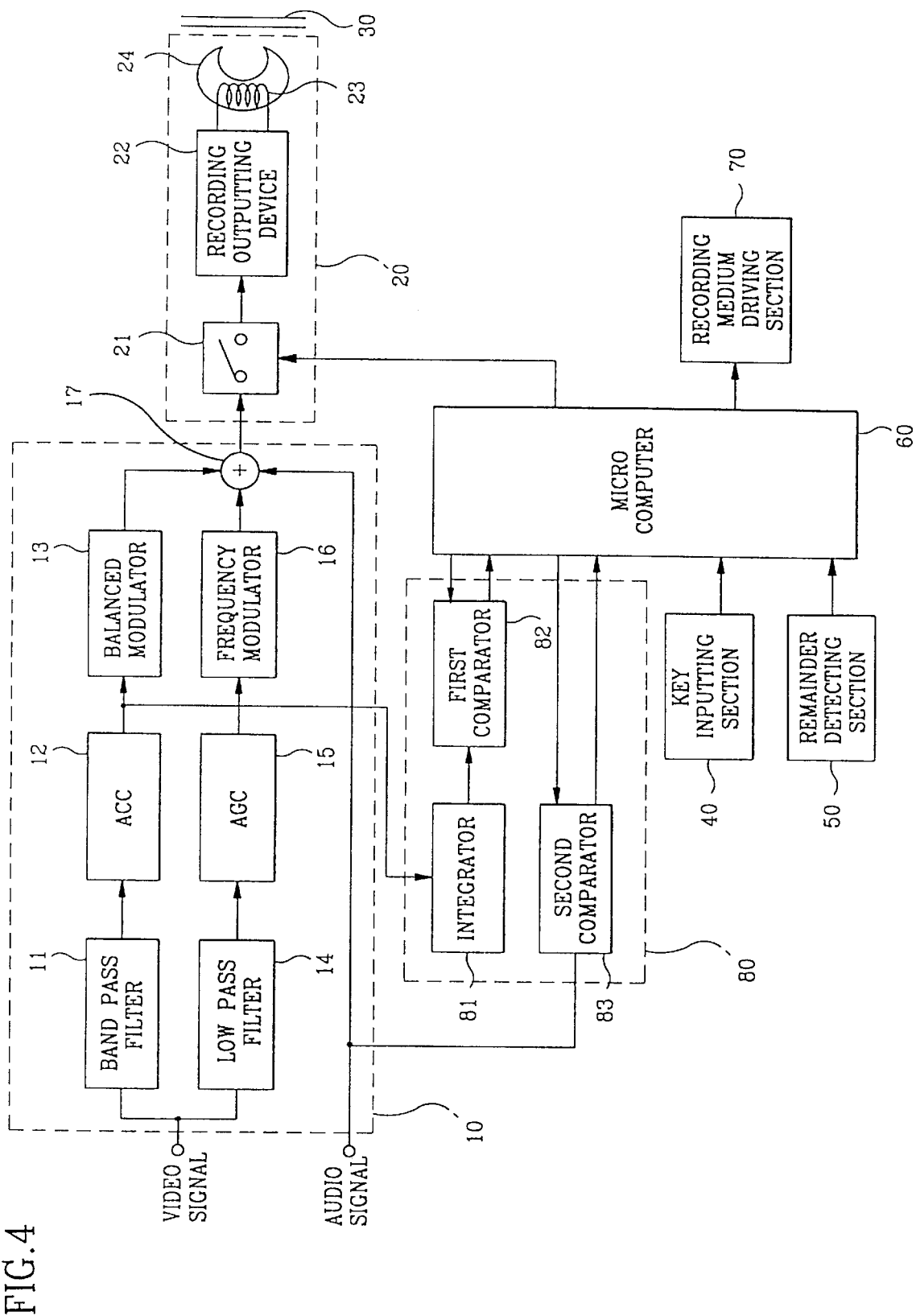
FIG. 4 illustrates the recording controlling apparatus utilizing the remainder of the recording medium according to the present invention.
Figure 5A:
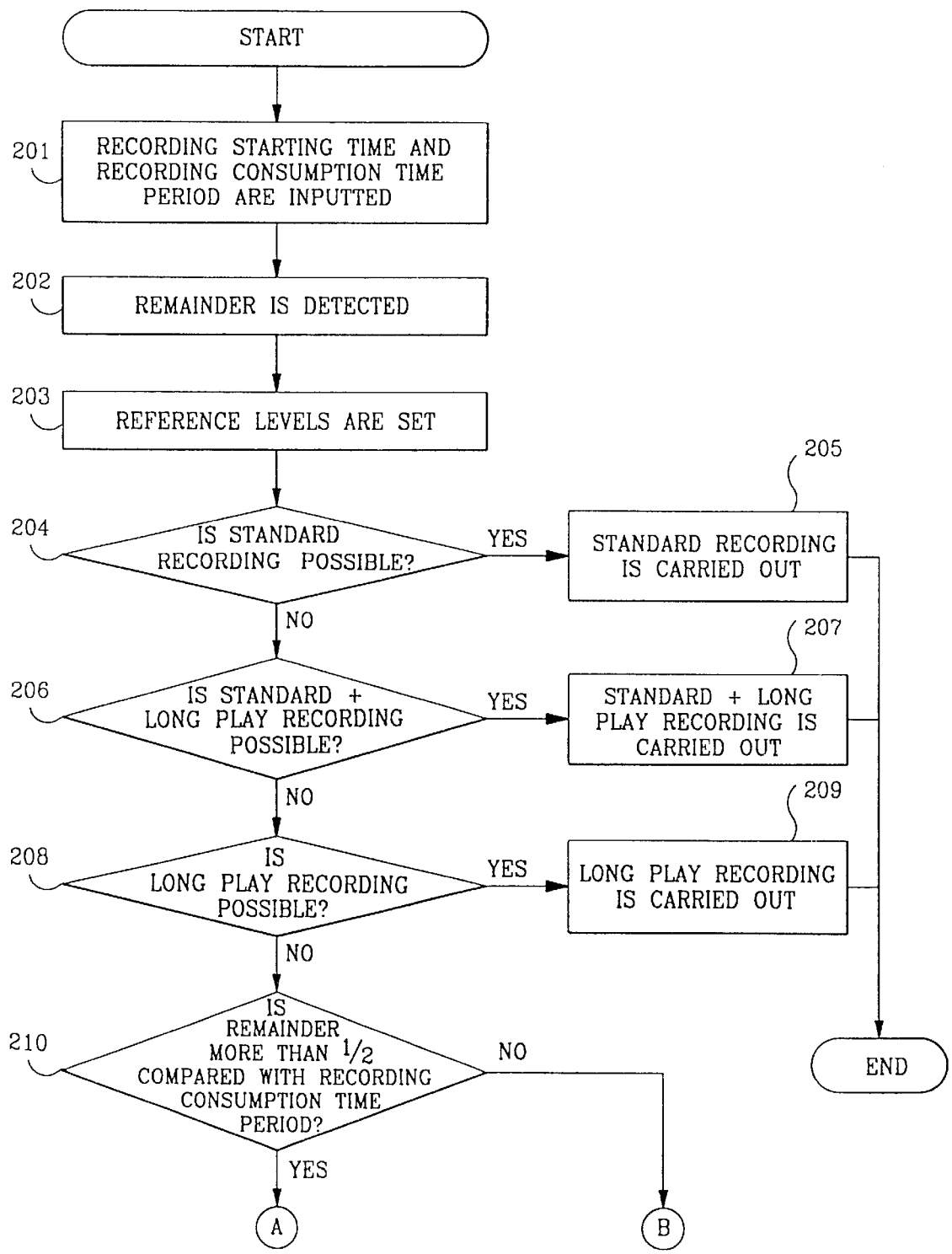
FIGS. 5A, 5B and 5C are flow charts showing the recording method utilizing the remainder of the recording medium according to the present invention.
Figure 5B:
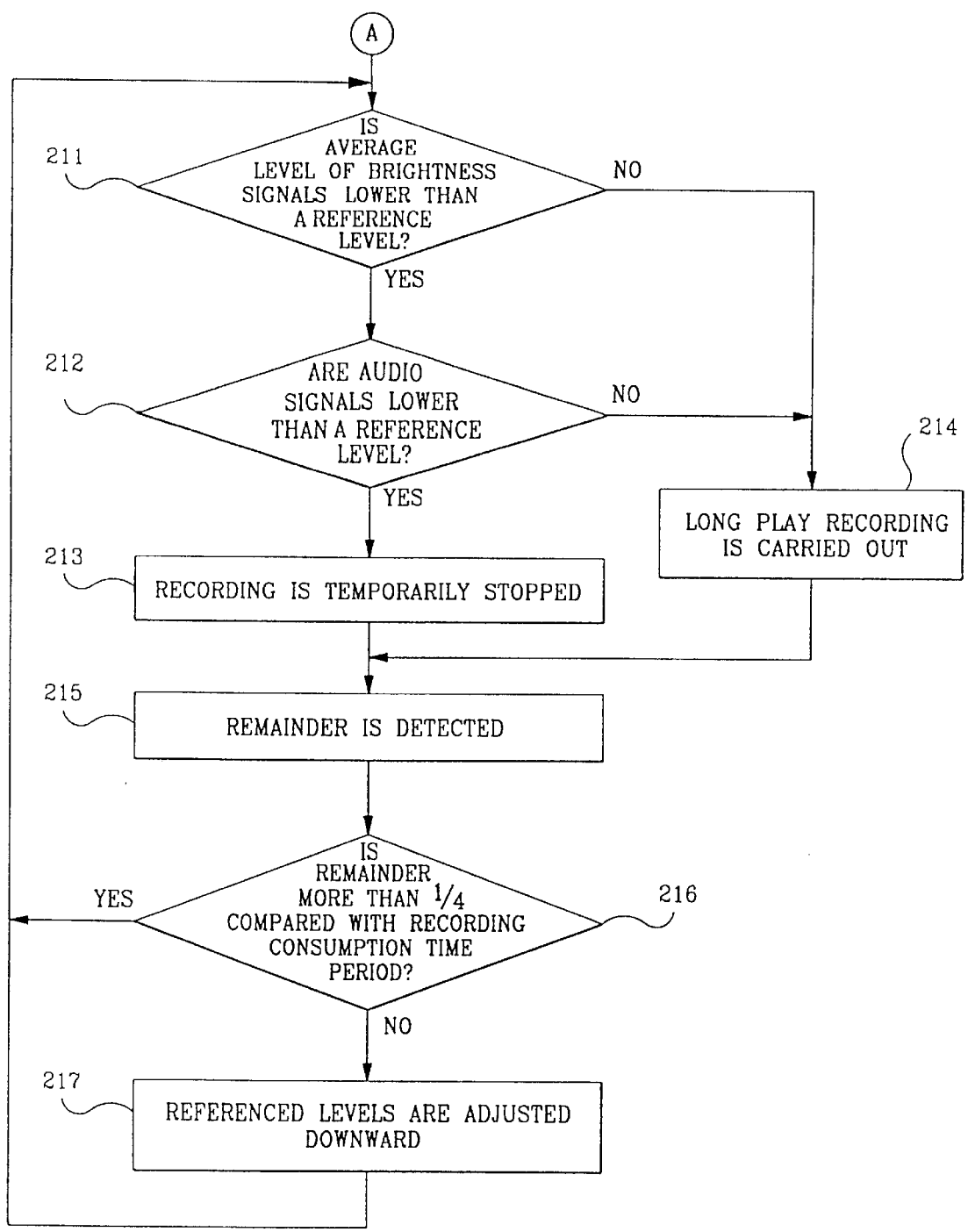
Figure 5C:
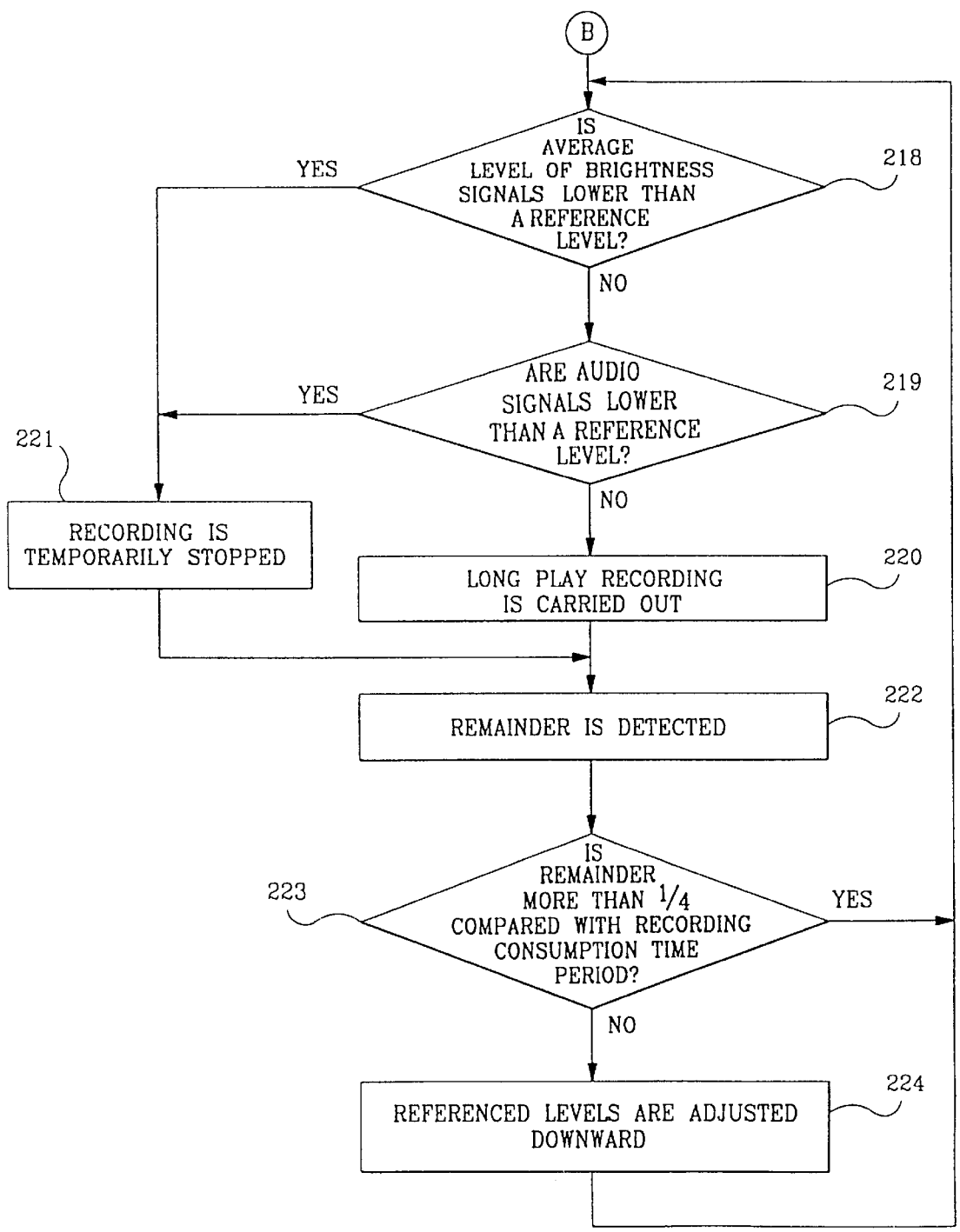

FIG. 4 illustrates the recording controlling apparatus utilizing the remainder of the recording medium, according to the present invention. FIGS. 5A, 5B and 5C are flow charts showing the recording method utilizing the remainder of the recording medium, according to the present invention.

The apparatus for controlling a recording in accordance with the remainder of a recording medium according to the present invention includes: a signal processing section 10 for separating the incoming video signals into brightness signals and carrier chroma signals, and for amplitude-controlling and modulating them to output recording signals; and a recording section 20 for recording the recording signals output from the signal processing section 10 onto a recording medium 30.

The apparatus further includes: a recording controlling section 80 for comparing audio signals and brightness signals of the signal processing section with reference levels; a key input section 40 for inputting a recording starting time and a consumption time period; a remainder detecting section 50 for detecting a recordable remainder of the recording medium 30; a recording medium driving section 70 for driving or stopping the recording medium, and for adjusting the recording speed.

The apparatus further includes a microcomputer 60 for setting reference levels of the recording controlling section 80, and for controlling the operations of the recording section 50 and the recording medium driving section 70 in accordance with the output signals of the key input section 40 and the remainder detecting section 50 based on a result of a comparison performed by the recording controlling section 80.

The signal processing section 10 includes: a band pass filter 11, an ACC 12, a balanced modulator 13, a low pass filter 14, an AGC 15 and a frequency modulator 16. The recording section 20 includes: a recording switch 21, a recording output device 22, a coil 23 and a recording head 24.

The recording controlling section 80 includes: an integrator 81 for integrating the brightness signals of the signal processing section 10 to obtain an average level of the brightness signals; a first comparator 82 for comparing the output signals of the integrator 81 with a reference level; and a second comparator 82 for comparing the audio signals with a reference level. The comparison results are supplied to the microcomputer 60.

The microcomputer 60 sets up variable reference levels in accordance with the detected remainder of the recording medium 30 as detected by the remainder detecting section 50. These variable reference levels are supplied to the first and second comparators 82 and 83, respectively.

Now the method for controlling the recording in accordance with the remainder of the recording medium according to the present invention will be described.

As shown in FIG. 5A, the user inputs into the recording controlling apparatus, through the key input section 40, a recording starting time and an expected consumption time period (201), in which the recording controlling apparatus is carrying out a reproduction.

At the same time, the recordable remainder of the recording medium 30, which is input from the remainder detecting section 50, is detected by the microcomputer 60 (202).

Then, a reference level is set so as to determine the magnitudes of the brightness signals and the audio signals (203).

The above constitute a first step.

Next, the microcomputer 60 determines adoption of "standard recording", "standard+long play recording", and "long play recording" modes according to the detected remainder of the recording medium 30, as detected in the first step by the remainder detecting section 50. Then, a control signal is output to the driving section 70 to carry out a recording with the adopted function (second step) (204–209) as shown in FIG. 5.

At the same time, the microcomputer 60 turns on the recording switch 21 to input the recording signals from the signal processing section 10 into the recording section 20. Thus, the desired images are recorded on the recording medium 30.

In the second step, for example, if the remainder of the recording medium 30 is more than ½ of compared with the recording consumption time (210), then the average levels of the audio signals of the signal processing section 10 and the brightness signals of the integrator 81 are compared with the reference levels by the first and second comparators 82 and 83 as shown in FIG. 4 (211–212 of FIG. 5B).

The microcomputer 60 receives the result of the comparison of 211–212. If the average levels of the audio signals and brightness signals are determined to be lower than the reference levels, then the recording operation is stopped. On the other hand, if any one of the average levels of the audio signals and the brightness signals is higher than the reference levels, then the long play recording operation is carried out (214) (third step).

The discussion of the average levels of the audio signals and the brightness signals are lower than the reference levels refers to the fact that the screen picture is darker than a reference level, or that the sounds are too weak.

Thereafter, the remainder of the recording medium 30 is detected again by the remainder detecting section 50 (215).

If the remainder is smaller than a reference amount, e.g., ¼ or less of the consumption time period (216), then the references levels are adjusted to lower levels. Then, the average levels of the brightness signals and the audio signals are again compared with the reference levels (211).

Meanwhile, after the second step, if the remainder of the recording medium 30 is smaller than the reference amount, e.g., ½ compared with the input consumption time period (210), then the average levels of the audio signals and the brightness signals are compared with the predetermined reference levels by the first and second comparators 82 and 83.

If any one of the average levels of the audio signals and the brightness signals are lower than the reference levels, the microcomputer executes a "temporary stop of recording" operation (221). Otherwise, if the average levels of the audio signals and the brightness signals are higher than the reference levels, long play recording is carried out. (220).

Thereafter, the remainder of the recording medium 30 is detected again by the remainder detecting section 50 (222). If the remainder of the recording medium is smaller than the reference amount, e.g., ¼ or less compared with the consumption time period, the reference levels are adjusted downward (224). Then, the average levels of the brightness signals and the audio signals are again compared with the reference levels (218) (fourth step).

According to the present invention as described above, if the remainder of the recording medium is insufficient, and thus it is impossible to record the total number of images even by using long play recording, then the result of the comparison of the audio signals and the brightness signals of the signal processing section with the reference levels is supplied to the microcomputer. In accordance with this result, the microcomputer controls the operations of the recording section and the driving section. Thus, if the pictures look darker than a reference level, or if the sounds are too weak, then the recording operation is temporarily stopped so that the images can be recorded onto the remainder of the recording medium to the maximum degree.

What is claimed is:

1. An apparatus for controlling a recording in accordance with a remainder of a recording medium, comprising:

a signal processing section for separating incoming video signals into brightness signals and carrier chroma signals, and receiving audio signals, to output recording signals;

a recording section for recording the recording signals of said signal processing section onto said recording medium;

a recording controlling section for comparing the audio signals and the brightness signals of said signal processing section with reference levels;

a remainder detecting section for detecting a recordable remainder of said recording medium;

a recording medium driving section for driving or stopping said recording medium, and for adjusting a recording speed; and a microcomputer for adjusting the reference levels of said recording controlling section and controlling driving or stopping operations of said recording section and said recording medium driving section in accordance with an output signal of said remainder detecting section based on a comparison result of said recording controlling section.

2. The apparatus as claimed in claim 1, wherein said recording controlling section comprises:

an integrator for integrating the brightness signals of said signal processing section to obtain an average level of the brightness signals;

a first comparator for comparing the output signals of said integrator with a reference level; and a second comparator for comparing the audio signals of said signal processing section with a reference level.

3. The apparatus as claimed in claim 2, wherein said microcomputer varies reference levels in accordance with the recordable remainder of said recording medium to supply adjusted reference levels to said first and second comparators.

4. A method for controlling a recording in accordance with a remainder of a recording medium, comprising the steps of:

a) inputting a recording starting time and a recording consumption time period, and detecting the recordable remainder of said recording medium;

b) judging on an adoption of standard recording, standard+long play recording, and long play recording in accordance with the detected recordable remainder of said recording medium, and carrying out a recording;

c) temporarily stopping the recording operation if the average levels of audio signals and brightness signals are judged to be lower than reference levels, and carrying out the long play recording if any one of the average levels of the is audio signals and the brightness signals is higher than the reference levels; and d) comparing the average levels of the audio signals and the brightness signals with the reference levels if the recordable remainder of the recording medium is smaller than a reference amount compared with the input consumption time period, executing temporary stop of recording if any one of the average levels of the audio signals and the brightness signals are lower than the reference levels, and carrying out the long play recording if both of the average levels of the audio signals and the brightness signals are higher than the reference levels.

5. The method as claimed in claim 4, wherein the recordable remainder of the recording medium is detected after carrying out the long play recording and the temporary stopping of recording at steps c) and d) respectively, and if the recordable remainder of the recording medium is smaller than the recording consumption time period, the respective reference levels are adjusted downward.

6. An apparatus for controlling a recording in accordance with a remainder of a recording medium, the apparatus comprising:

a signal processor receiving a video signal and an audio signal, separating the video signal into a brightness signal and a carrier chroma signal, and generating a recording signal from the separated brightness and carrier chroma signals and the audio signal;

a recording unit coupled to the signal processor, wherein the recording unit records the recording signal onto said recording medium;

a recording controlling unit coupled to the signal processor, the recording controlling unit receiving the audio signal and the brightness signal and comparing the brightness signal with a first reference level and comparing the audio signal with a second reference level;

a microcomputer coupled to the recording controlling unit and the recording unit;

a remainder detecting unit coupled to the microcomputer, wherein the remainder detecting unit detects a recordable remainder of the recording medium; and a recording medium driving unit coupled to the microcomputer, the recording medium driving unit driving and stopping the recording medium, and adjusting a recording speed;

wherein the microcomputer adjusts at least one of the reference levels of the recording controlling unit and controls driving and stopping operations of the recording unit and the recording medium driving unit in accordance with an output signal of the remainder detecting unit based on a comparison result of the recording controlling unit.

7. The apparatus as claimed in claim 6, wherein the recording controlling unit comprises:

an integrator generating an average level of the brightness signal in response to receiving the brightness signal from the signal processor;

a first comparator comparing an output signal of the integrator with the first reference level; and a second comparator comparing the audio signal with the second reference level.

8. The apparatus as claimed in claim 7, wherein the microcomputer varies at least one of the reference levels in accordance with the recordable remainder of said recording medium to supply an adjusted reference level to one of the first and second comparators.

* * * * *